(12) United States Patent
Ozeki et al.

(10) Patent No.: US 7,110,877 B2
(45) Date of Patent: Sep. 19, 2006

(54) AUTOMATIC ENGINE SHUTDOWN APPARATUS

(75) Inventors: Takashi Ozeki, Saitama (JP); Yoshiaki Tsukada, Saitama (JP); Hiroyuki Kojima, Saitama (JP); Masahiro Kuroki, Saitama (JP); Hiroaki Uchisasai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/139,585

(22) Filed: May 31, 2005

(65) Prior Publication Data

US 2006/0030997 A1    Feb. 9, 2006

(30) Foreign Application Priority Data

Aug. 5, 2004   (JP)   ............... 2004-229417

(51) Int. Cl.
- F02B 77/08   (2006.01)
- G06G 19/00   (2006.01)
- B60L 3/00    (2006.01)

(52) U.S. Cl. .................. 701/112; 123/198 D

(58) Field of Classification Search ............. 123/179.4, 123/198 D, 198 DB, 198 DC, 630; 701/101, 701/102, 103, 112, 114, 115; 307/9.1, 10.1, 307/10.2; 477/166, 174, 181; 340/426.1, 340/427

See application file for complete search history.

(56) References Cited

U.S. PATENT DOCUMENTS

| | | | | |
|---|---|---|---|---|
| 4,362,133 A | * | 12/1982 | Malik | 123/179.4 |
| 4,364,343 A | * | 12/1982 | Malik | 123/179.4 |
| 6,060,981 A | * | 5/2000 | Landes | 307/10.2 |
| 6,371,889 B1 | * | 4/2002 | Kuroda et al. | 477/181 |
| 6,763,298 B1 | * | 7/2004 | Boggs et al. | 701/112 |
| 6,883,310 B1 | * | 4/2005 | Nakatani et al. | 60/288 |
| 6,961,654 B1 | * | 11/2005 | Boggs et al. | 701/112 |

FOREIGN PATENT DOCUMENTS

| | | | | |
|---|---|---|---|---|
| JP | 2000-115908 A | | 4/2000 | |
| JP | 2004019448 A | * | 1/2004 | 701/112 |
| JP | 2005344677 A | * | 12/2005 | 123/198 D |

* cited by examiner

*Primary Examiner*—Willis R. Wolfe, Jr.
(74) *Attorney, Agent, or Firm*—Birch, Stewart, Kolasch & Birch, LLP

(57) ABSTRACT

An automatic engine shutdown apparatus for automatically shutting down an engine under a predetermined running or operating condition. The apparatus includes a vehicle speed sensor for detecting a vehicle speed, a throttle sensor for detecting a throttle opening, a travel history memory for storing a travel history of a vehicle, and an engine shutdown controller for automatically shutting down the engine depending on the vehicle speed, the throttle opening, and the travel history. The engine shutdown controller shuts down the engine after elapse of a standby time depending on the travel history since a predetermined engine shutdown condition has been satisfied. As a result, the automatic engine shutdown time is optimized depending on predetermined running or operating conditions of the vehicle.

18 Claims, 6 Drawing Sheets

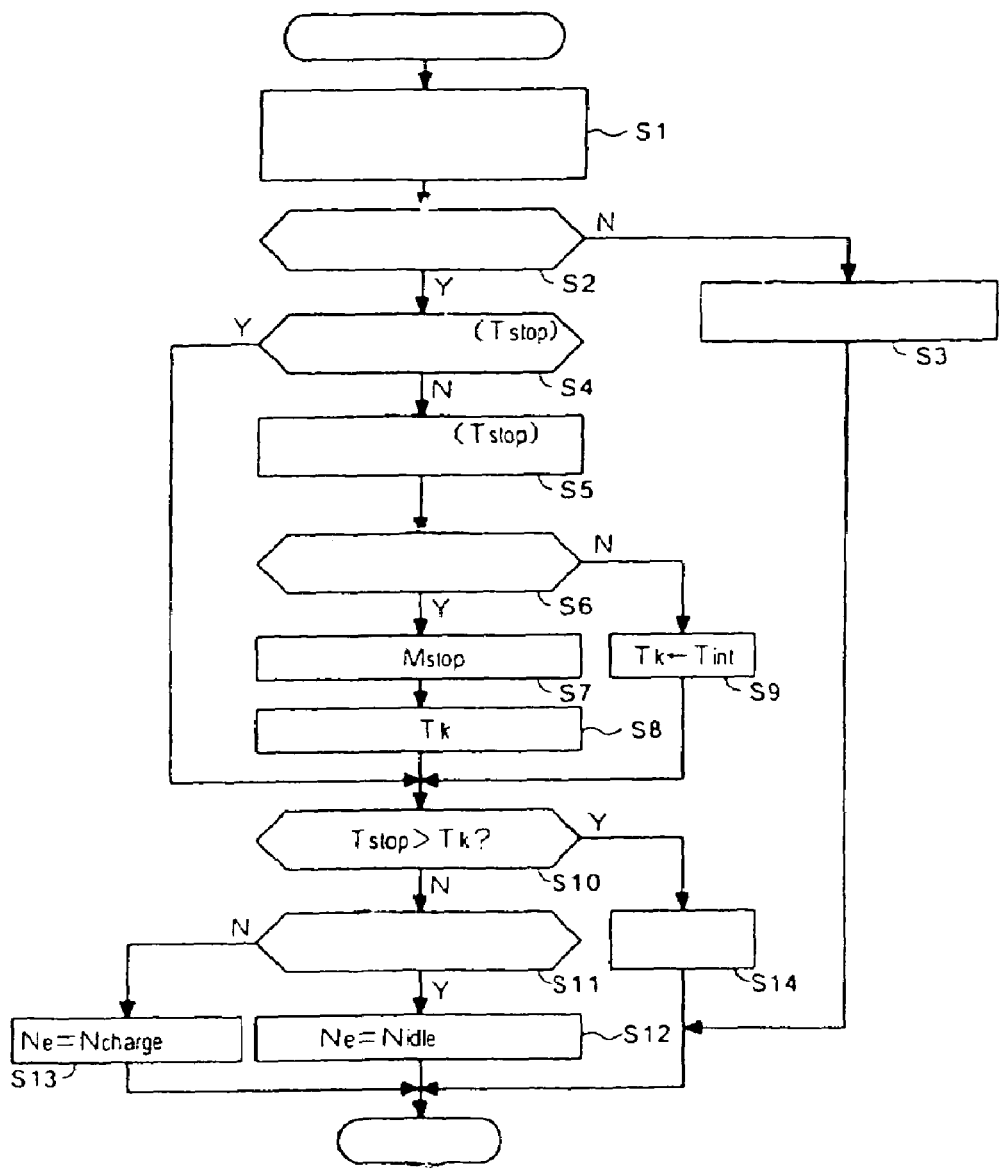

ENGINE SHUTDOWN CONTROL
S1: DETECT THROTTLE OPENING θth, VEHICLE SPEED V
S2: IS ENGINE SHUTDOWN CONDITION SATISFIED?
S3: RESET VEHICLE STOP TIME TIMER (Tstop)
S4: IS VEHICLE STOP TIME TIMER (Tstop) MEASURING TIME?
S5: START VEHICLE STOP TIME TIMER (Tstop)
S6: IS SUFFICIENT TRAVEL HISTORY COLLECTED?
S7: DETECT VEHICLE STOP FREQUENCY Mstop
S8: DETERMINE STANDBY TIME Tk
S11: IS CHARGED CAPACITY OF BATTERY SUFFICIENT?
S12: OPERATE WITH Ne = Nidle
S13: OPERATE Ne = Ncharge
S14: SHUT DOWN ENGINE
RETURN

FIG. 5

AUTOMATIC ENGINE SHUTDOWN APPARATUS

CROSS-REFERENCE TO RELATED APPLICATION

The present application claims priority under 35 U.S.C. §119 to Japanese Patent Application No. 2004-229417, filed Aug. 5, 2004, the entire contents of which are hereby incorporated by reference.

BACKGROUND OF THE INVENTION

1. Field of the Invention

The present invention relates to an automatic engine shutdown apparatus, and more particularly to an automatic engine shutdown apparatus for automatically shutting down an engine in view of the travel history of a vehicle.

2. Description of Background Art

Electric vehicles having a motor as a power source are environment-friendly and have good acceleration and deceleration responses. However, they have disadvantages in that their cruising distance is presently short due to a limited battery capacity and the unit cost of energy per traveled distance is high, making the electric vehicles less economic. Hybrid vehicles carrying a motor and an engine are put to practical use as eliminating the disadvantages and taking the advantages of the electric vehicles.

Generally known hybrid vehicles are classified into the series hybrid type, wherein only a motor is used as a power source of the vehicle and an engine is used as a drive source for a generator for charging a battery; the parallel hybrid type, wherein a motor and an engine are used as power sources of the vehicle and selectively operated depending on running conditions, etc.; and the series parallel type wherein the above two types are selectively used depending on running conditions.

Japanese Patent Laid-Open No. 2000-115908 discloses a hybrid vehicle technology for shutting down the engine when the accelerator pedal is not depressed, the vehicle speed is of a predetermined value or less, and the remaining charged capacity of the battery is sufficient, in order to reduce wasteful fuel consumption while the hybrid vehicle is at rest and also to reduce the emission of exhaust gases.

According to the related art described above, if engine shutdown conditions are satisfied based on the accelerator pedal state and the vehicle speed, the engine is automatically shut down unless remaining charged capacity of the battery is insufficient. In the related art described above, the travel history of the vehicle is not taken into account in shutting down the engine. When the hybrid vehicle runs on a jammed street, the engine tends to be repeatedly automatically shut down and restarted. If a standby time after an automatic engine shutdown condition is satisfied until the engine is actually shut down is set to a long period depending on the travel on the jammed street, then when the hybrid vehicle stops at a traffic signal, or the like, while running on a street with less traffic, the engine is not immediately shut down.

SUMMARY AND OBJECTS OF THE INVENTION

It is an object of the present invention to provide an automatic engine shutdown apparatus for automatically shutting down an engine under a predetermined condition, which will solve the above related-art problems and allows an automatic engine shutdown time to be optimized depending on the running state of a vehicle.

In order to achieve the above object, in accordance with the present invention provides an automatic engine shutdown apparatus for automatically shutting down an engine under a predetermined running or operating condition. The apparatus includes:

(1) a vehicle speed sensor for detecting a vehicle speed; and a throttle sensor for detecting a throttle opening, travel history memory means for storing a travel history of a vehicle, and engine shutdown control means for automatically shutting down the engine depending on the vehicle speed, the throttle opening, and the travel history.

(2) The engine shutdown control means shuts down the engine after elapse of a standby time depending on the travel history since a predetermined engine shutdown condition has been satisfied.

(3) The engine shutdown control means increases the standby time as the vehicle stops more frequently.

(4) The automatic engine shutdown apparatus further includes means for storing an initial value with respect to the standby time, wherein the engine shutdown control means shuts down the engine after elapse of the initial value since detected results of the vehicle speed and the throttle opening have satisfied predetermined conditions if information relative to the travel history is short.

(5) In the automatic engine shutdown apparatus, the travel history represents the number of times that the vehicle stops within a predetermined period of time.

(6) According to the present invention, there is also provided an automatic engine shutdown apparatus for automatically shutting down an engine under a predetermined running or operating condition, the automatic engine shutdown apparatus including power transmitting means for transmitting power of the engine to a drive wheel. This apparatus includes a starting clutch disposed between the engine and the power transmitting means, for transmitting the power of the engine to the power transmitting means when the engine reaches a predetermined rotational speed, a vehicle speed sensor for detecting a vehicle speed, a throttle sensor for detecting a throttle opening, travel history memory means for storing a travel history of a vehicle, and engine shutdown control means for automatically shutting down the engine depending on the vehicle speed, the throttle opening, and the travel history.

The present invention offers the following advantages:

(1) Since an engine shutdown time is determined in view of not only the vehicle speed and the throttle opening, but also the running state, the engine can automatically be shut down at an optimum time depending on the running state.

(2) Since the engine is shut down after elapse of the standby time depending on the travel history since the predetermined engine shutdown condition has been satisfied, the engine can automatically be shut down at an optimum time depending on the running state.

(3) Since the standby time after the engine shutdown condition is satisfied until the engine is automatically shut down is increased as the vehicle stops more frequently, the engine is prevented from being frequency shut down and started while the vehicle is running on a jammed street. When the vehicle stops less frequently while running on a street with less traffic, the standby time after the engine shutdown condition is satisfied until the engine is shut down is reduced, thereby preventing the engine from idling uselessly. Therefore, the engine can be optimally controlled for shutdown.

(4) If information relative to the travel history is short, the engine is shut down after elapse of the initial value that has been pre-registered since the engine shutdown condition has been satisfied. Therefore, even during a period shortly after the vehicle has started running, the engine can be optimally controlled for shutdown.

(5) Further, the frequency with which the vehicle stops can easily be determined.

(6) In addition, the power of the engine is blocked by the starting clutch and is not transmitted to a power transmitting mechanism, and hence the power transmitting mechanism does not operate. Therefore, the fuel consumption rate is increased. Inasmuch as the engine shutdown time is determined in view of not only the vehicle speed and the throttle opening, but also the running state, the engine can automatically be shut down at an optimum time depending on the running state. As a result, the fuel consumption rate is further increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a flowchart of an engine shutdown control process;

DETAILED DESCRIPTION OF THE PREFERRED EMBODIMENTS

Figure 1:
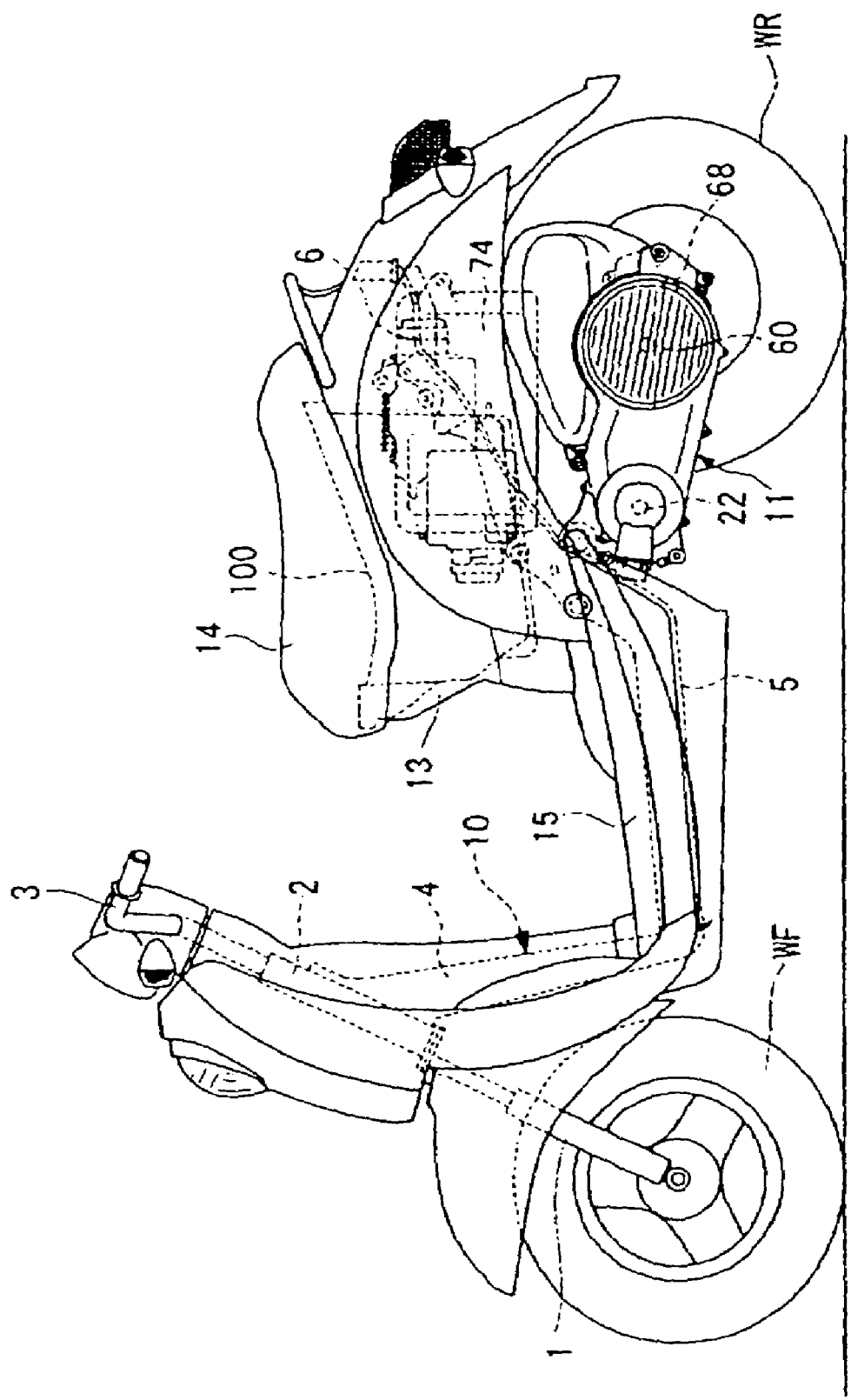
FIG. 1 is a side elevational view of a two-wheeled vehicle as an embodiment of a hybrid vehicle according to the present invention.

FIG. 1 is a side elevational view of an embodiment of a hybrid vehicle to which the present invention is applied.

A hybrid vehicle has a front fork 1 on which a front wheel WF is supported by a shaft forwardly of a vehicle body. The front fork 1 is pivotally supported on a head pipe 2 and can be steered by a handle 3. A down pipe 4 is mounted on and extends rearwardly and downwardly from the head pipe 2. An intermediate frame 5 extends substantially horizontally from the lower end of the down pipe 4. A rear frame 6 extends rearwardly and upwardly from the rear end of the intermediate frame 5.

A power unit 11 including a power source has an end pivotally mounted on a vehicle frame 10 that is constructed as described above. A rear wheel WR is rotatably mounted on the other rear end of the power unit 11, and suspended by a rear cushion mounted on the rear frame 6.

The vehicle frame 10 is covered with a vehicle cover 13, and a seat 14 for the rider to be seated thereon is fixed to a rear upper surface of the vehicle cover 13. A step floor 15 for the rider to place its feet thereon is disposed forwardly of the seat 14. A storage box 100 functioning as a utility space for storing a helmet, a cargo, etc. is disposed below the seat 14.

Figure 2:
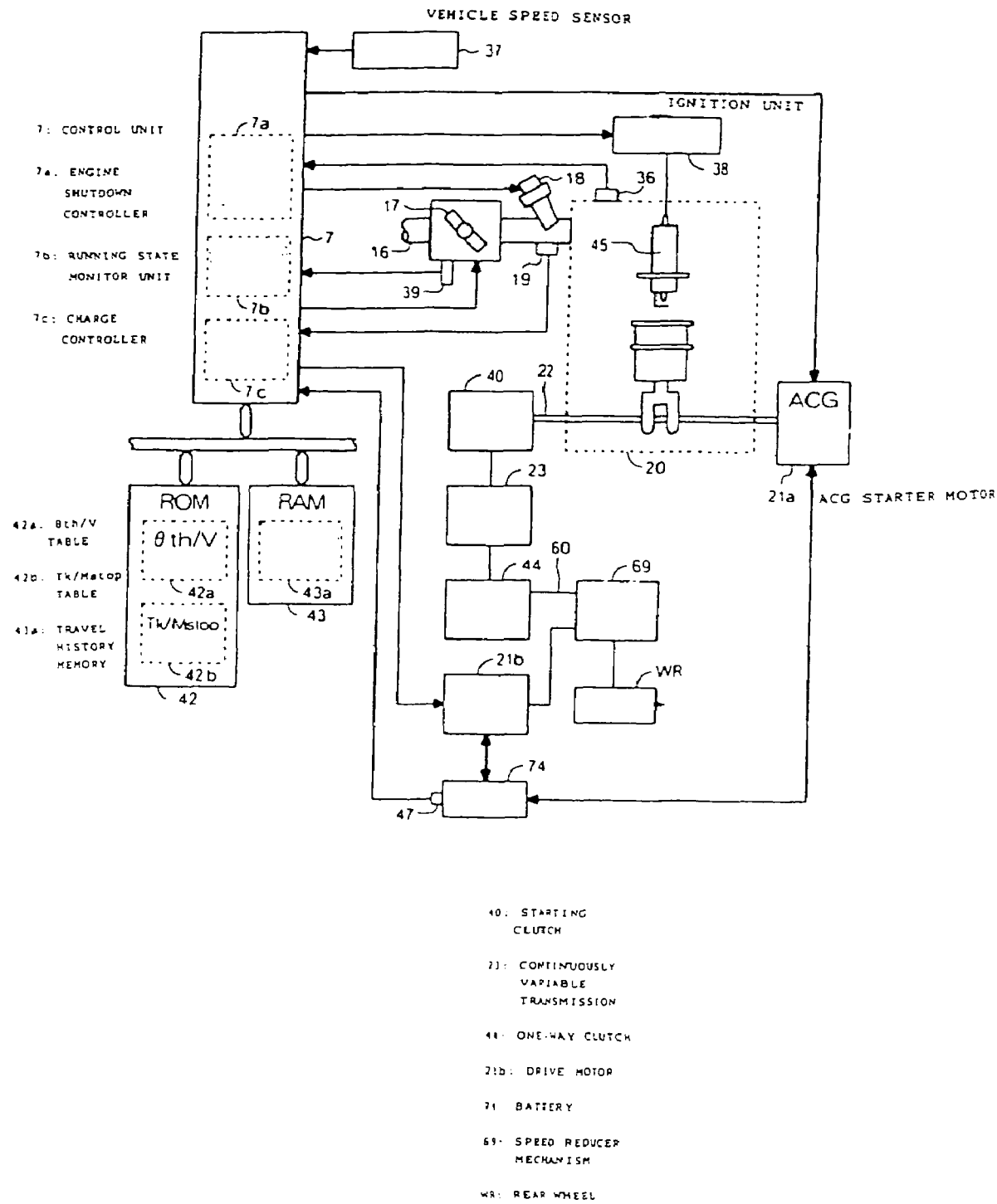
FIG. 2 is a block diagram of a system arrangement of the two-wheeled vehicle shown in FIG. 1.

FIG. 2 is a block diagram of a system arrangement of the hybrid vehicle. The power unit 11 comprises an engine 20, an ACG starter motor 21a functioning as an engine starter and generator, a continuously variable transmission (power transmitting means) 23 coupled to a crankshaft 22 for transmitting power of the engine 20 to the rear wheel WR, a starting clutch 40 for selectively transmitting power between the crankshaft 22 and the input shaft of the continuously variable transmission 23, a drive motor 21b functioning as a motor or a generator, a one-way clutch (one-way power transmitting means) 44 for transmitting power from the engine 20 and the drive motor 21b to the rear wheel WR, but preventing power from being transmitted from the rear wheel WR to the engine 20, and a speed reducer mechanism 69 for transmitting output power from the continuously variable transmission 23 at a certain speed reduction ratio to the rear wheel WR. The rotational speed Ne of the engine 20 is detected by an engine rotational speed sensor 36.

Power from the engine 20 is transmitted from the crankshaft 22 through the starting clutch 40, the continuously variable transmission 23, the one-way clutch 44, a drive shaft 60, and the speed reducer mechanism 69 to the rear wheel WR. Power from the drive motor 21b is transmitted through the drive shaft 60 and the speed reducer mechanism 69 to the rear wheel WR. In the present embodiment, the driver shaft 60 doubles as the output shaft of the drive motor 21b.

A battery 74 is connected to the ACG starter motor 21a and the drive motor 21b. The battery 74 supplies electric power to the drive motor 21b and the ACG starter motor 21a when the drive motor 21b functions as a motor and the ACG starter motor 21a functions as a starter. The battery 74 is charged with electric power regenerated by the ACG starter motor 21a and the drive motor 21b when the ACG starter motor 21a and the drive motor 21b function as generators.

The engine 20 has an intake pipe 16 housing a throttle valve 17 angularly movably disposed therein for controlling the rate of intake air flowing through the intake pipe 16. The throttle valve 17 is angularly moved depending on the movement of a throttle grip (not shown) that is operated by the rider of the hybrid vehicle. Between the throttle valve 17 and the engine 20, there are disposed an injector 18 for injecting fuel and a negative pressure sensor 19 for detecting a negative pressure in the intake pipe 16. The throttle valve 17 has its opening θth detected by a throttle sensor 39. An ignition unit 38 supplies ignition energy at a predetermined ignition time to a spark plug 45. The vehicle speed of the hybrid vehicle is detected by a vehicle speed sensor 37.

A control unit 7 has an engine shutdown controller 7a for automatically shutting down the engine 20 when the hybrid vehicle stops, a running state monitor unit 7b for monitoring the running state of the hybrid vehicle, and a charge controller 7c for monitoring the remaining charged capacity of the battery 74 based on a battery voltage detected by a voltage sensor 47 and controlling the charging of the battery 74 when the hybrid vehicle stops.

A ROM 42 includes a θth/V table 42a containing an engine shutdown condition, to be described in detail later, determined using the throttle opening θth and the vehicle speed V as parameters, and a Tk/Mstop table 42b containing the corresponding relationship between a standby time Tk after an engine shutdown condition is satisfied until the engine is actually shut down, and a vehicle stop frequency Mstop. A RAM 43 includes a travel history memory 43a for storing the history of the running state detected by the running state monitor unit 7b.

Figure 3:
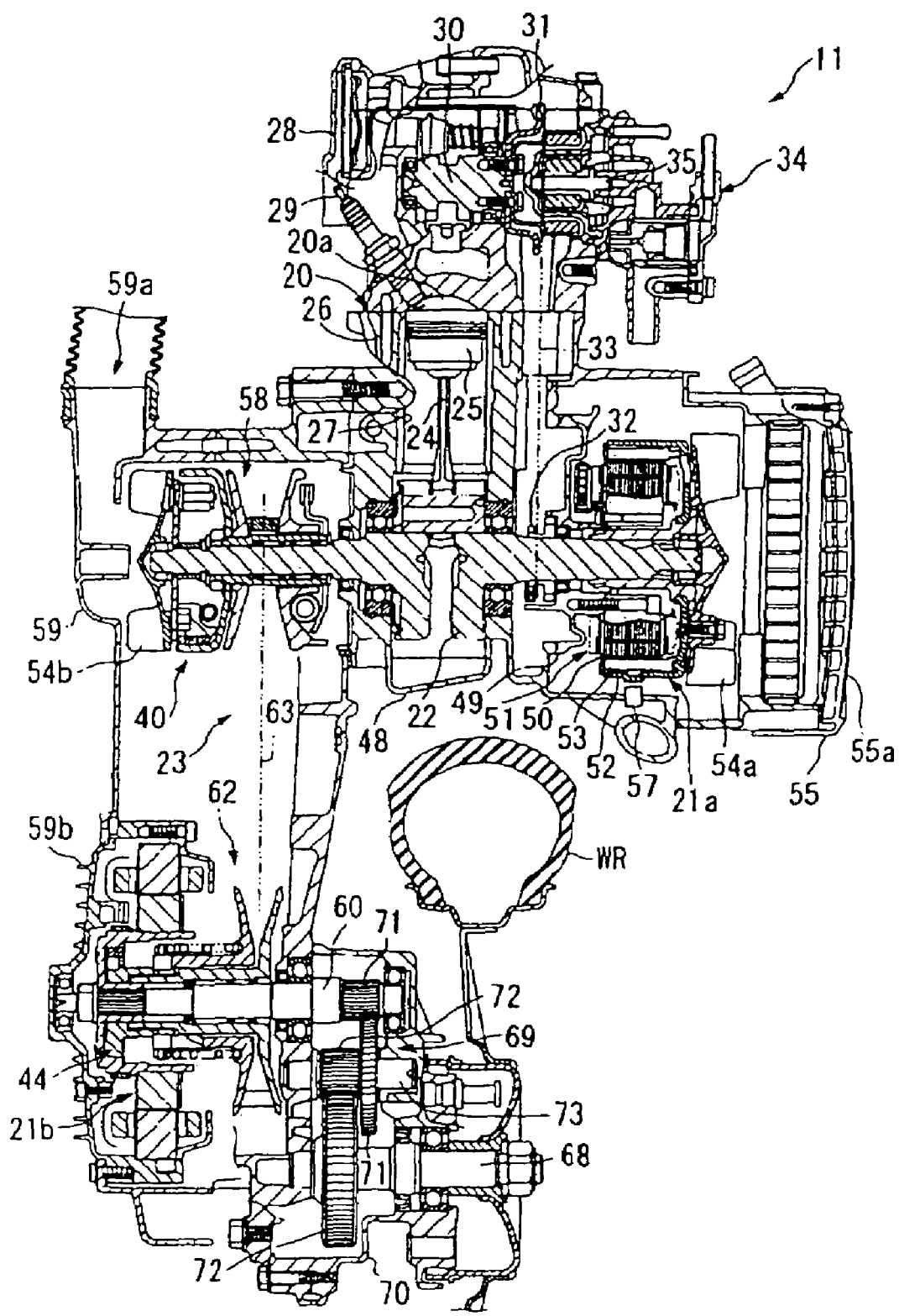
FIG. 3 is a cross-sectional view of a power unit of the two-wheeled vehicle shown in FIG. 1.

Structural details of the power unit 11 including the engine 20 and the drive motor 21b will be described below with reference to FIG. 3.

The engine 20 has a piston 25 operatively coupled to the crankshaft 22 by a connecting rod 24. The piston 25 is slidable in a cylinder 27 disposed in a cylinder block 26. The cylinder block 26 is arranged such that the cylinder 27 has a substantially horizontal axis. A cylinder head 28 is fixed to a front surface of the cylinder block 26. The cylinder head 28, the cylinder 27, and the piston 25 jointly define a combustion chamber 20a for combusting an air-fuel mixture therein.

Valves (not shown) for controlling the intake of an air-fuel mixture into the combustion chamber 20a and the discharge of exhaust gases from the combustion chamber 20a, and a spark plug 29 are mounted in the cylinder head 28. The valves are opened and closed by the rotation of a camshaft 30 which is rotatably supported in the cylinder head 28. The camshaft 30 has a driven sprocket 31 mounted on an end thereof, and an endless cam chain 33 is trained around the driven sprocket 31 and a drive sprocket 32 mounted on an end of the crankshaft 22. A water pump 34 for cooling the engine 20 is connected to the end of the camshaft 30. The water pump 34 has a rotatable shaft 35 attached for rotation with the camshaft 30. Therefore, the water pump 34 operates when the camshaft 30 rotates.

A stator case 49 is coupled to a transversely right side of a crankcase 48 by which the crankshaft 22 is rotatably supported, and houses the ACG starter motor 21a therein. The ACG starter motor 21a is a so-called outer-rotor motor and has a stator comprising a coil 51 in the form of a conductive wire wound around teeth 50 fixed to the stator case 49. An outer rotor 52 is fixed to the crankshaft 22 and has a substantially cylindrical shape covering the stator. Magnets 53 are disposed on the inner circumferential surface of the outer rotor 52.

A fan 54a for cooling the ACG starter motor 21a is mounted on the outer rotor 52. When the fan 54a rotates in synchronism with the crankshaft 22, cooling air is introduced from a cooling air inlet defined in a side wall 55a of a cover 55 of the stator case 49.

A transmission case 59 is coupled to a transversely left side of the crankcase 48, and houses therein a fan 54b fixed to the left end of the crankshaft 22, the continuously variable transmission 23 whose drive side is coupled to the crankshaft 22 through the starting clutch 40, and the drive motor 21b coupled to the driven side of the continuously variable transmission 23. The fan 54b serves to cool the continuously variable transmission 23 and the drive motor 21b which are housed in the transmission case 59. The fan 54b is disposed on the same side of the continuously variable transmission 23 as that of the drive motor 21b, i.e., on the transversely left side of the hybrid vehicle according to the present embodiment.

A cooling air inlet 59a is disposed in a front left side of the transmission case 59. When the fan 54b rotates in synchronism with the crankshaft 22, ambient air is introduced from the cooling air inlet 59a positioned near the fan 54b into the transmission case 59, forcibly cooling the drive motor 21b and the continuously variable transmission 23.

The continuously variable transmission 23 is a belt converter including a drive transmission pulley 58 mounted on the left end portion of the crankshaft 22 that projects transversely from the crankcase 48 with the starting clutch 40 interposed therebetween, a driven transmission pulley 62 mounted on the drive shaft 60 parallel to the crankshaft 22 with the one-way clutch 44 interposed therebetween, and an endless V-belt (endless belt) 63 trained around the drive transmission pulley 58 and the driven transmission pulley 62.

Figure 4:
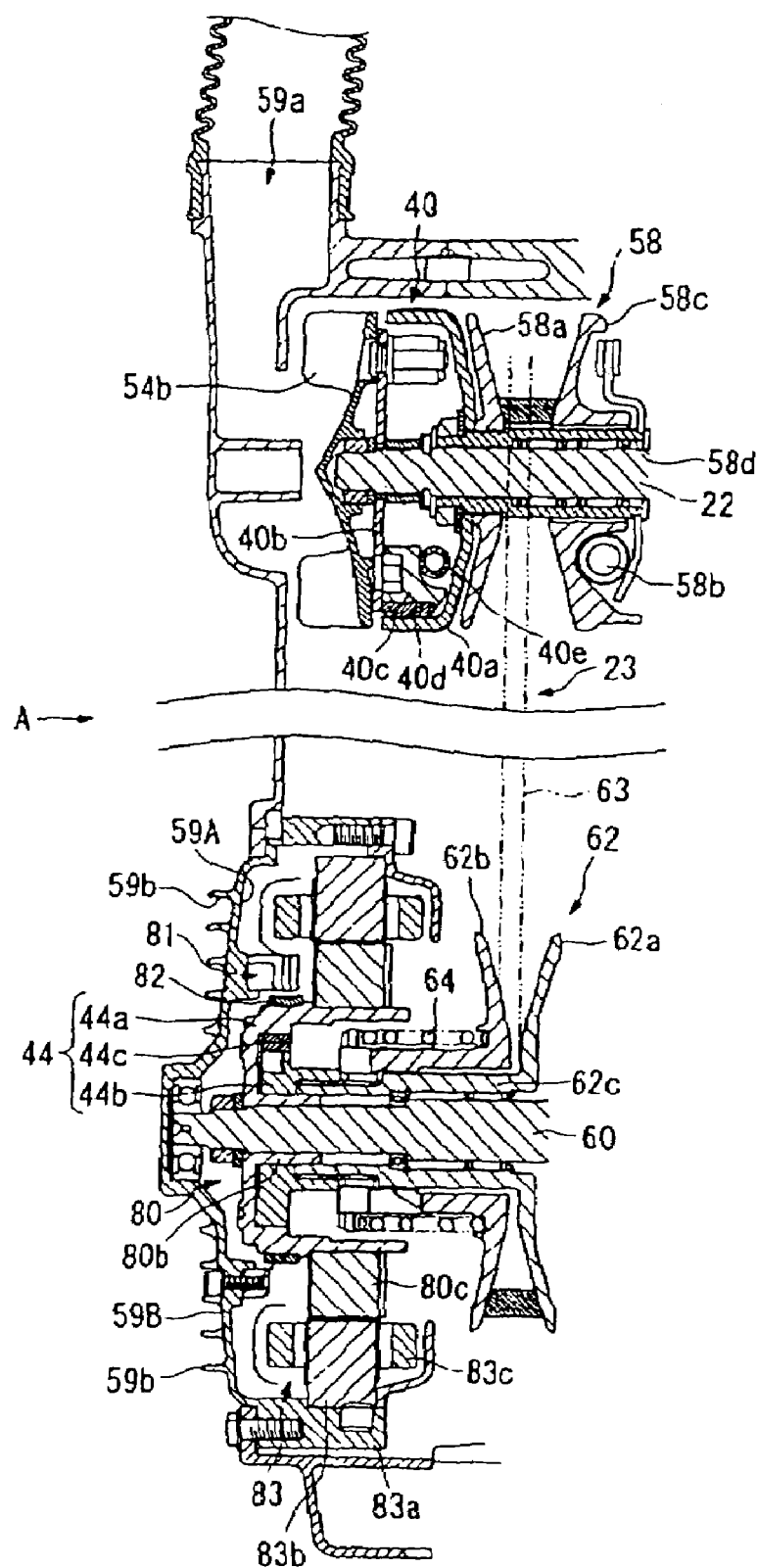
FIG. 4 is an enlarged fragmentary view of FIG. 3.

As shown fragmentarily at an enlarged scale in FIG. 4, the drive transmission pulley 58 is mounted circumferentially rotatably on the crankshaft 22 with a sleeve 58d interposed therebetween. The drive transmission pulley 58 comprises a fixed drive pulley member 58a fixedly mounted on the sleeve 58d and a movable drive pulley member 58c axially slidably, but circumferentially nonrotatably, mounted on the sleeve 58d.

The driven transmission pulley 62 comprises a fixed driven pulley member 62a mounted axially nonslidably, but circumferentially rotatably, on the drive shaft 60, and a movable driven pulley member (movable driven pulley) 62b mounted axially slidably on a boss 62c of the fixed driven pulley member 62a.

The endless V-belt 63 is trained around belt grooves of substantially V-shaped cross section which are defined between the fixed drive pulley member 58a and the movable drive pulley member 58c and between the fixed driven pulley member 62a and the movable driven pulley member 62b.

A spring (resilient member) 64 for normally biasing the movable driven pulley member 62b toward the fixed driven pulley member 62a is disposed behind the movable driven pulley member 62b, i.e., on the transversely left side of the movable driven pulley member 62b.

When the rotational speed of the crankshaft 22 increases, a weight roller 58b of the drive transmission pulley 58 is subjected to a centrifugal force, causing the movable drive pulley member 58c to slide toward the fixed drive pulley member 58a. The movable drive pulley member 58c moves toward the fixed drive pulley member 58a, reducing the width of the groove of the drive transmission pulley 58. The position where the drive transmission pulley 58 and the V-belt 63 contact each other is shifted radially outwardly, increasing the radius of the circle around which the V-belt 63 is trained. Accordingly, the width of the groove defined between the fixed driven pulley member 62a and the movable driven pulley member 62b of the driven transmission pulley 62 is increased. Thus, depending on the rotational speed of the crankshaft 22, the radius of the circle around which the V-belt 63 is trained, i.e., the transmission pitch circle diameter, changes continuously, causing the speed reduction ratio to change automatically and continuously.

The starting clutch 40 is disposed outwardly of the continuously variable transmission 23, i.e., on the transversely left side in the present embodiment, i.e., between the fixed drive pulley member 58a and the fan 54b closely to the cooling air inlet 59a on the transmission case 59.

The starting clutch 40 comprises a cup-shaped outer case 40a fixedly mounted on the sleeve 58d, an outer plate 40b fixed to the left end of the crankshaft 22, a shoe 40d mounted on an outer circumferential portion of the outer plate 40b by a weight 40c and facing radially outwardly, and a spring 40e for biasing the shoe 40d radially inwardly.

When the rotational speed of the engine, i.e., the rotational speed of the crankshaft 22, is equal to or lower than a predetermined value, e.g., 3000 rpm, no power is transmitted between the crankshaft 22 and the continuously variable transmission 23. As the rotational speed of the engine increases and hence the rotational speed of the crankshaft 22 increases to a value in excess of the predetermined value, the centrifugal force acting on the weight 40c counteracts the resilient force applied radially inwardly by the spring 40e, causing the weight 40c to move radially outwardly, whereupon the shoe 40d presses the inner circumferential surface of the outer case 40a with a force equal to or greater than a predetermined value. The rotation of the crankshaft 22 is now transmitted through the outer case 40a to the sleeve 58d, driving the drive transmission pulley 58 fixed to the sleeve 58d.

The one-way clutch 44 comprises a cup-shaped outer clutch member 44a, an inner clutch member 44b inserted coaxially in the outer clutch member 44a, and a roller 44c for transmission power unidirectionally from the inner clutch member 44b to the outer clutch member 44a. The outer clutch member 44a doubles as the inner rotor body of the drive pulley 21b and is constructed as a member identical to the inner rotor body.

Power from the engine 20 which is transmitted to the driven transmission pulley 62 of the continuously variable transmission 23 is transmitted through the fixed driven pulley member 62a, the inner clutch member 44b, the outer clutch member 44a, i.e., the inner rotor body, the drive shaft 60, and the speed reducer mechanism 69 to the rear wheel WR. When the hybrid vehicle is pushed by the rider or is in a regenerative mode, power from the rear wheel WR is transmitted through the speed reducer mechanism 69 and the drive shaft 60 to the inner rotor body, i.e., the outer clutch member 44a. Since the outer clutch member 44a rotates idly with respect to the inner clutch member 44b, the power from the rear wheel WR is not transmitted to the continuously variable transmission 23 and the engine 20.

The inner-rotor-type drive motor 21b with the drive shaft 60 serving as a motor output shaft is disposed in a rear portion of the transmission case 59.

The drive motor 21b has an inner rotor 80 comprising the drive shaft 60 which also serves as the output shaft of the continuously variable transmission 23, the cup-shaped inner rotor body, i.e., the outer clutch member 44a, splined to the drive shaft 60 by a central boss 80b thereof, and magnets 80c disposed on an outer circumferential surface of the outer clutch member 44a near the open end thereof. A plurality of detectable elements 82 for being detected by a rotor sensor 81 mounted on an inner wall surface 59A of the transmission case 59 are mounted on an outer circumferential surface of the outer clutch member 44a near the bottom end thereof. The drive motor 21b has a stator 83 comprising a coil 83c in the form of a conductive wire wound around teeth 83b fixed to a stator case 83a in the transmission case 59.

The drive motor 21b functions as a motor for assisting in the output power of the engine 20 and also functions as a generator for converting the rotation of the drive shaft 60 into electric energy to charge the battery 74 not shown in FIG. 4 in the regenerative mode. The drive motor 21b is directly mounted on the inner wall surface 59A of the transmission case 59, which is made of metal, by the stator case 83a. A plurality of cooling fins 59b extending longitudinally of the hybrid vehicle and spaced at intervals are mounted on an outer wall surface 59B of the transmission case 59 at locations where the drive motor 21b is directly mounted on the inner wall surface 59A.

Referring back to FIG. 3, the speed reducer mechanism 69 is disposed in a transmission chamber 70 that is contiguous to a right side of the rear end of the transmission case 59. The speed reducer mechanism 69 has an intermediate shaft 73 rotatably supported parallel to the drive shaft 60 and the axle 68 of the rear wheel WR, a pair of first speed reducer gears 71 mounted respectively on a right end portion of the drive shaft 60 and a central portion of the intermediate shaft 73, and a pair of second speed reducer gears 72 mounted respectively on a left end portion of the intermediate shaft 73 and a left end portion of the axle 68. The rotation of the drive shaft 60 is transmitted at a predetermined speed reduction ratio to the axle 68 of the rear wheel WR which is rotatably supported parallel to the drive shaft 60.

For starting the engine 20, the crankshaft 22 is rotated by the ACG starter motor 21a on the crankshaft 22. At this time, the starting clutch 40 is not engaged, and no power is transmitted from the crankshaft 22 to the continuously variable transmission 23.

When the rotational speed of the crankshaft 22 exceeds the predetermined value, e.g., 3000 rpm, depending on the movement of the throttle grip, the rotational power of the crankshaft 22 is transmitted through the starting clutch 40 to the continuously variable transmission 23, the one-way clutch 44, and the speed reducer mechanism 69, driving the rear wheel WR. When the hybrid vehicle is thus started, the drive motor 21b may be energized by the electric power supplied from the battery 74 to assist in the rotation of the drive shaft 60 that is rotated by the power from the engine 20.

The hybrid vehicle may be started by the drive motor 21b only, rather than by the engine 20. In this case, since the rotation of the drive shaft 60 that is rotated by the drive motor 21b is not transmitted to the driven transmission pulley 62 by the one-way clutch 44, the continuously variable transmission 23 is not driven. Therefore, when the rear wheel WR is driven by the drive motor 21b only, the energy transmitting efficiency is increased.

If the load on the engine 20 is large upon acceleration or high-speed running while the hybrid vehicle is being propelled by the engine 20 only, the engine-propelled travel may be assisted by the drive motor 21b. At this time, the rotational power of the crankshaft 22 which is rotated by the reciprocating motion of the crankshaft 22 is transmitted through the starting clutch 40, the continuously variable transmission 23, and the one-way clutch 44 to the drive shaft 60, and the power from the drive motor 21b is also transmitted to the drive shaft 60. Therefore, the combination of the power from the engine 20 and the power from the drive motor 21b drives the rear wheel WR through the speed reducer mechanism 69. Conversely, while the hybrid vehicle is being propelled by the drive motor 21b only, the motor-propelled travel may be assisted by the engine 20.

While the hybrid vehicle is being driven at a constant speed in a cruise mode by the drive motor 21b only, when the engine 20 is operated, the continuously variable transmission 23 may not be driven, but the ACG starter motor 21a may generate electric power, if the rotational speed of the crankshaft 22 is equal to or lower than the rotational speed for engaging the starting clutch 40, i.e., the predetermined value referred to above.

While the hybrid vehicle is being thus driven at a constant speed by the drive motor 21b only, the energy transmitting efficiency is better because the power is transmitted from the drive motor 21b to the rear wheel WR without the continuously variable transmission 23 being driven.

When the hybrid vehicle is decelerated, since the one-way clutch 44 does not transmit the rotation of the drive shaft 60 to the driven transmission pulley 62 of the continuously variable transmission 23, the rotation of the axle 68 can be directly transmitted through the speed reducer mechanism 69, to the drive motor 21b in the regenerative mode without the continuously variable transmission 23 being driven.

Specifically, when the rear wheel WR drives the drive motor 21b in the regenerative mode, since the power transmitted from the rear wheel WR to the drive motor 21b is not consumed to drive the continuously variable transmission 23, the charging efficiency in the regenerative mode is increased.

FIG. 5 is a flowchart of an engine shutdown control process that is performed by the engine shutdown controller 7a. The engine shutdown control process is repeatedly performed in predetermined cyclic periods.

Figure 6:
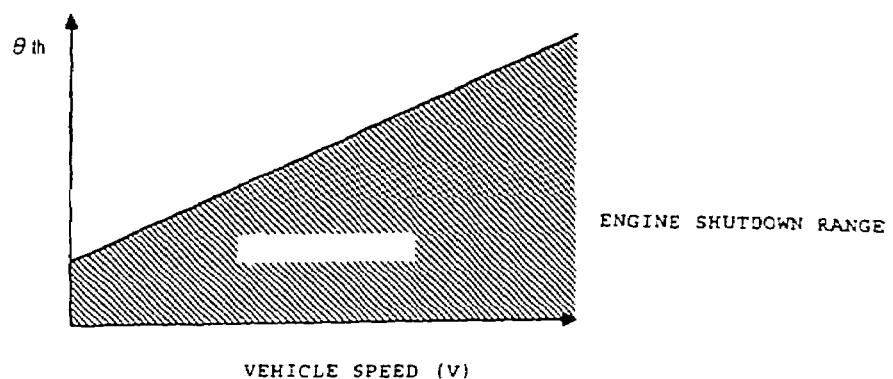
FIG. 6 is a diagram showing an engine shutdown condition established using a throttle opening θth and a vehicle speed V as parameters.

In step S1, the throttle opening θth is detected based on an output signal from the throttle sensor 39, and the vehicle speed V is detected based on an output signal from the vehicle speed sensor 37. In step S2, it is determined whether an engine shutdown condition is satisfied or not. In the present embodiment, the engine shutdown condition using the throttle opening θth and the vehicle speed V as parameters established in the θth/V table 42a, as shown in FIG. 6. If the relationship between the throttle opening θth and the vehicle speed V satisfies the engine shutdown condition, then control goes to step S4.

In step S4, it is determined whether a vehicle stop time timer Tstop for measuring a continuous period of time in which the engine shutdown condition is satisfied is measuring the continuous period of time, i.e., whether the vehicle stop time timer Tstop has started, or not. Since the vehicle stop time timer Tstop is initially not measuring the continuous period of time, control goes to step S5 in which the vehicle stop time timer Tstop starts measuring the continuous period of time. In step S6, it is determined whether the travel history memory 43a of the RAM 43 has collected a sufficient travel history or not.

In the present embodiment, the vehicle running state after the ignition switch is turned on until it is turned off is monitored by the running state monitor unit 7b, and is stored as a travel history in the travel history memory 43a. If the period of time that has elapsed since the hybrid vehicle has started running is not short and a sufficient travel history has been collected, then control goes to step S7 in which the vehicle stop frequency Mstop is detected based on the travel history. In the present invention, the moving average of the number of times that the hybrid vehicle has stopped in a predetermined unit time is determined as the vehicle stop frequency Mstop.

Figure 7:
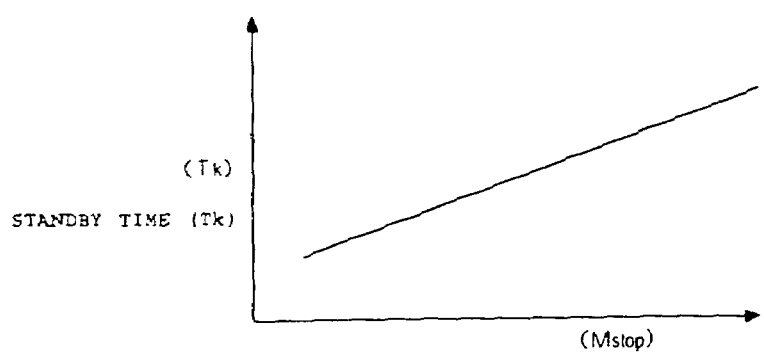
FIG. 7 is a diagram showing the corresponding relationship between a vehicle stop frequency Mstop and a standby time Tk.

In step S8, a standby time Tk after the engine shutdown condition is satisfied until the engine is actually shut down is determined based on the vehicle stop frequency Mstop. In the present invention, the corresponding relationship between the vehicle stop frequency Mstop and the standby time Tk is pre-registered in the Tk/Mstop table 42b, as shown in FIG. 7, such that the standby time Tk is longer as the vehicle stop frequency Mstop is higher. The standby time Tk corresponding to the vehicle stop frequency Mstop is determined.

If no sufficient travel history has been collected immediately after the hybrid vehicle has started running, then control goes from step S6 to step S9 in which a predetermined initial value Tint is registered as the standby time Tk.

In step S10, the vehicle stop time timer Tstop is compared with the standby time Tk. If the vehicle stop time timer Tstop exceeds the standby time Tk, then control goes to step S14 in which the engine 20 is automatically shut down. If the vehicle stop time timer Tstop does not exceed the standby time Tk, then control goes to step S11 in which the remaining charged capacity of the battery 74 is detected based on the battery voltage that is periodically detected by the voltage sensor 47.

If the remaining charged capacity of the battery 74 is sufficient, then control goes to step S12 in which the engine rotational speed Ne while the hybrid vehicle is at rest is maintained at the level of an idling speed Nidle. If the remaining charged capacity of the battery 74 is not sufficient, then control goes to step S13. In step S13, the engine rotational speed Ne while the hybrid vehicle is at rest is maintained at the level of a charging speed Ncharge that is higher than the idling speed Nidle and slightly lower than the clutch engaging speed of the starting clutch 40, by the charge controller 7c.

Thereafter, if the vehicle stop time timer Tstop exceeds the standby time Tk as detected in step S10, then control goes to step S14 in which the engine 20 is automatically shut down. If the hybrid vehicle starts running before the vehicle stop time timer Tstop exceeds the standby time Tk and it is judged in step S2 that the engine shutdown condition is not satisfied, then control goes to step S3 in which the vehicle stop time timer Tstop is reset.

According to the present embodiment, as described above, if the vehicle stop frequency is higher as when the hybrid vehicle is running on a jammed street, then the standby time after the engine shutdown condition is satisfied until the engine is shut down is increased to prevent the engine from being frequently shut down and started. If the vehicle stop frequency is lower as when the hybrid vehicle is running on a street with less traffic, then the standby time after the engine shutdown condition is satisfied until the engine is shut down is reduced to prevent the engine from idling uselessly. Therefore, the engine can be optimally controlled for shutdown depending on the running state of the vehicle.

Figure 8:
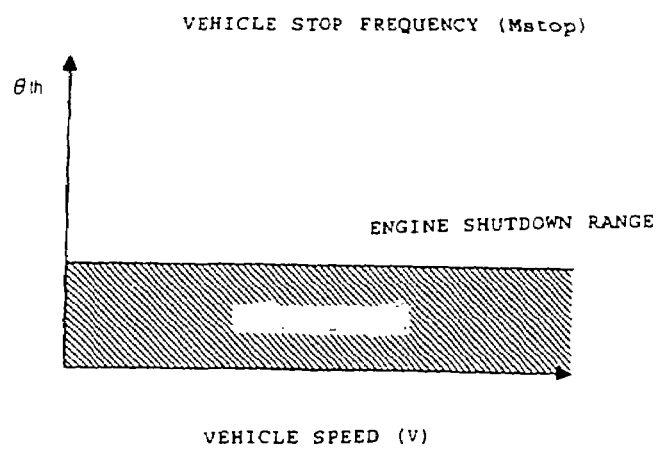
FIG. 8 is a diagram showing another engine shutdown condition established using a throttle opening θth and a vehicle speed V as parameters.

In the above embodiment, the engine shutdown condition is established using the throttle opening θth and the vehicle speed V as parameters. Howvever, as shown in FIG. 8, the engine shutdown condition may be established using the throttle opening θth only as a parameter, irrespective of the vehicle speed V.

The present invention is not limited to the above embodiment, but various design changes may be made therein without departing from the scope of the invention. For example, the present invention is not limited to being applied to a two-wheeled vehicle, but may be applied to other movable vehicles such as a three-wheeled vehicle, a four-wheeled vehicle, etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automatic engine shutdown apparatus for automatically shutting down an engine under a predetermined running or operating condition, comprising:
 a vehicle speed sensor for detecting a vehicle speed;
 a throttle sensor for detecting a throttle opening;

travel history memory means for storing a travel history of a vehicle; and engine shutdown control means for automatically shutting down the engine depending on the vehicle speed, the throttle opening, and the travel history.

2. The automatic engine shutdown apparatus according to claim 1, wherein said travel history represents the number of times that the vehicle stops within a predetermined period of time.

3. The automatic engine shutdown apparatus according to claim 1, wherein said engine shutdown control means shuts down the engine after elapse of a standby time depending on the travel history since a predetermined engine shutdown condition has been satisfied.

4. The automatic engine shutdown apparatus according to claim 3, wherein said travel history represents the number of times that the vehicle stops within a predetermined period of time.

5. The automatic engine shutdown apparatus according to claim 3, wherein said engine shutdown control means increases said standby time as the vehicle stops more frequently.

6. The automatic engine shutdown apparatus according to claim 5, wherein said travel history represents the number of times that the vehicle stops within a predetermined period of time.

7. The automatic engine shutdown apparatus according to claim 3, further comprising:

means for storing an initial value with respect to said standby time;

wherein said engine shutdown control means shuts down the engine after elapse of said initial value if information relative to said travel history is short, since the detected vehicle speed and the detected throttle opening have satisfied the predetermined engine shutdown conditions.

8. The automatic engine shutdown apparatus according to claim 7, wherein said travel history represents the number of times that the vehicle stops within a predetermined period of time.

9. An automatic engine shutdown apparatus for automatically shutting down an engine under a predetermined running or operating condition, the automatic engine shutdown apparatus including power transmitting means for transmitting power of the engine to a drive wheel, comprising:

a starting clutch disposed between said engine and said power transmitting means, for transmitting the power of the engine to said power transmitting means when said engine reaches a predetermined rotational speed;

a vehicle speed sensor for detecting a vehicle speed;

a throttle sensor for detecting a throttle opening;

travel history memory means for storing a travel history of a vehicle; and engine shutdown control means for automatically shutting down the engine depending on the vehicle speed, the throttle opening, and the travel history.

10. The automatic engine shutdown apparatus according to claim 9, wherein said travel history represents the number of times that the vehicle stops within a predetermined period of time.

11. The automatic engine shutdown apparatus according to claim 9, wherein said engine shutdown control means shuts down the engine after elapse of a standby time depending on the travel history since a predetermined engine shutdown condition has been satisfied.

12. The automatic engine shutdown apparatus according to claim 11, wherein said engine shutdown control means increases said standby time as the vehicle stops more frequently.

13. The automatic engine shutdown apparatus according to claim 11, further comprising:

means for storing an initial value with respect to said standby time;

wherein said engine shutdown control means shuts down the engine after elapse of said initial value if information relative to said travel history is short, since the detected vehicle speed and the detected throttle opening have satisfied the predetermined engine shutdown condition.

14. A method for automatically shutting down an engine of a vehicle under a predetermined running or operating condition, comprising the steps of:

detecting a speed of the vehicle;

detecting a throttle opening of the vehicle;

detecting and storing the travel history of a vehicle; and automatically shutting down the engine depending on the vehicle speed, the throttle opening, and the travel history.

15. The method for automatically shutting down an engine according to claim 14, wherein said travel history represents the number of times that the vehicle stops within a predetermined period of time.

16. The method for automatically shutting down an engine according to claim 14, wherein the step of automatically shutting down the engine includes shutting down the engine after elapse of a standby time depending on the travel history since a predetermined engine shutdown condition has been satisfied.

17. The method for automatically shutting down an engine according to claim 16, wherein the step of automatically shutting down the engine includes increasing said standby time as the vehicle stops more frequently.

18. The method for automatically shutting down an engine according to claim 16, further comprising the steps of:

storing an initial value with respect to said standby time; and shutting down the engine after elapse of said initial value if information relative to said travel history is short, since the detected vehicle speed and the detected throttle opening have satisfied the predetermined engine shutdown condition.

* * * * *